March 24, 1970     TOMOKAZU KAZAMAKI ETAL     3,502,393
LENS SYSTEM WITH LARGE TELEPHOTO RATIO
Filed March 28, 1967
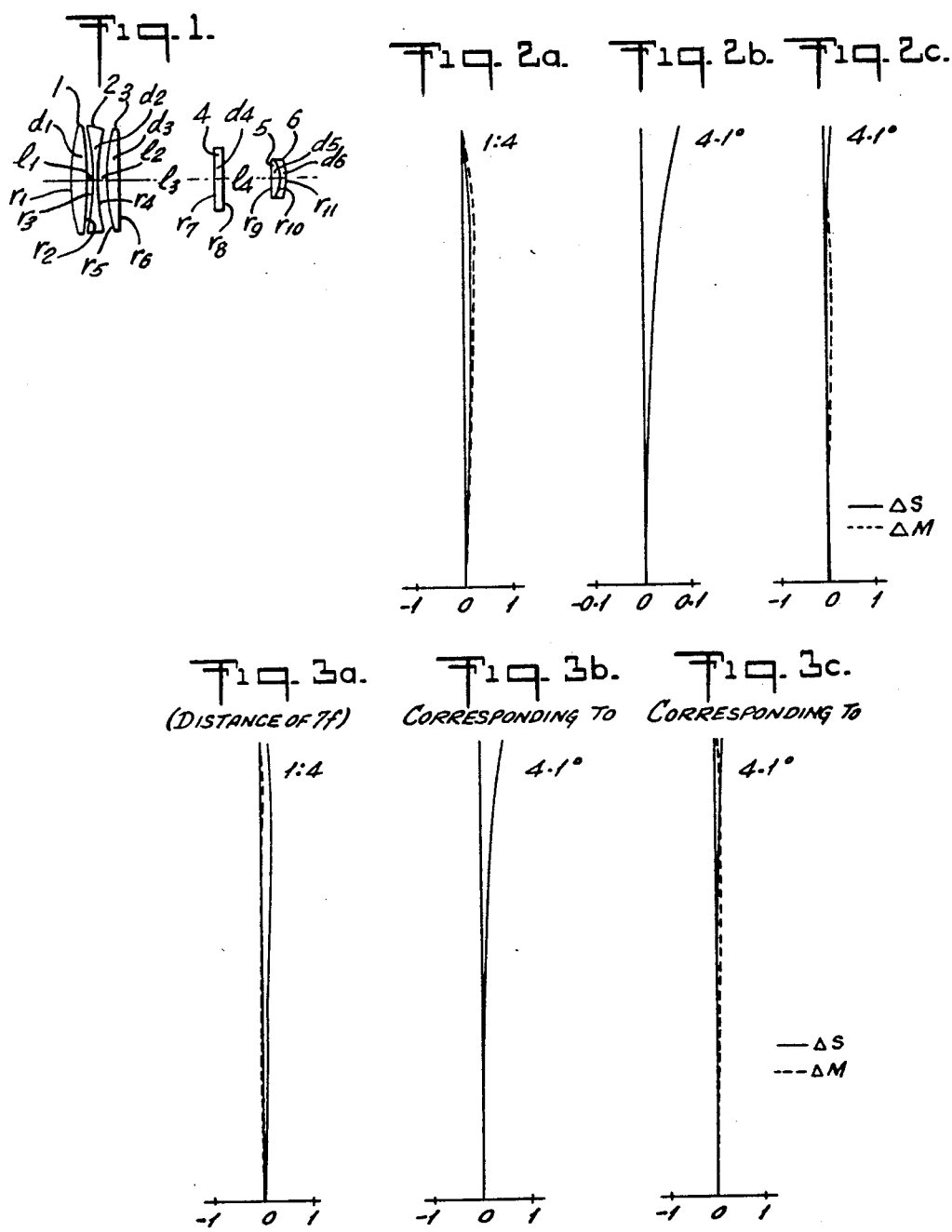
INVENTORS
TOMOKAZU KAZAMAKI
TORU MATSUMOTO
BY Stanley Wolder
ATTORNEY 3,502,393
LENS SYSTEM WITH LARGE TELEPHOTO RATIO
Tomokazu Kazamaki and Tohru Matsumoto, Tokyo-to, Japan, assignors to Asahi Kogaku Kogyo Kabushiki Kaisha, Tokyo-to, Japan, a corporation of Japan
Filed Mar. 28, 1967, Ser. No. 626,583
Claims priority, application Japan, Apr. 5, 1966, 41/20,964
Int. Cl. G02b 9/60, 13/02, 11/30
U.S. Cl. 350—216       1 Claim

ABSTRACT OF THE DISCLOSURE

A telephoto lens system having a low telephoto ratio includes a first positive lens, a second negative lens, a third positive lens, a fourth positive lens, a fifth positive lens and a sixth negative lens, the fifth and sixth lenses being cemented together. The index of refraction of the sixth lens is less than that of the fifth lens, the focal length of the combined first three lenses is less than that of the lens system focal length $f$, the focal length of the first four lenses is less than $f/19$, the distance between the fourth and fifth lens is equal to or greater than $0.07f$ and the rear face of the fourth lens is convex and has a radius of curvature less than $3f$.

BACKGROUND OF THE INVENTION

The present invention relates generally to improvements in telephoto lens systems and it relates particularly to an improved high power telephoto lens system having a high telephoto ratio.

With respect to an infinitely distant object, the distance between the first surface and the focal plane of the conventional 35 mm. telephoto objective lens system is of the order of $0.95f$–$0.85f$, such distance being designated as the "whole length" L. In the non-telephoto lens system, L is greater than $f$, the focal length of the lens system. If the focal length $f$ is large, a smaller L results in a smaller-sized, more compact and lighter weight objective, which is much more convenient to carry and use. However, an excessively small L, and accordingly an excessively high telephoto ratio, generally results in an over-correction of Petzval sum which determines the curvature of the image plane. Thus, about $L=0.85f$ is considered to be of very high telephoto ratio within the heretofor practically available range.

SUMMARY OF THE INVENTION

An object of the present invention is to provide an improved telephoto lens system.

Another object of the present invention is to provide an improved telephoto lens system having a high telephoto ratio.

Still another object of the present invention is to provide a telephoto system of high telephoto ratio which is highly corrected for spherical aberration.

The above and other objects of the present invention will become apparent from a reading of the following description taken in conjunction with the accompanying drawing.

In accordance with the present invention, a telephoto lens system is achieved with a telephoto ratio far exceeding that in which $L<0.85F$, for example, $L<0.75f$, in which the naturally resulting over-correction of the Petzval sum is repressed as far as possible with a lens system, reducing the influence thereof by a unique aberration correcting method.

In the 5-group 5-lens system telephoto objective described in the copending U.S. patent application, Ser. No. 470,711; filed in the name of Kazamaki, Tomokazu on July 9, 1965 astigmatism aberration is corrected by a novel arrangement which results in a great improvement in the correction of coma aberration. Now, in the arrangement of the present invention, the advantages of this type of lens system is obtained and in addition, part of the Petzval sum over-correction due to a high telephoto ratio is compensated by substituting for the fifth lens of the aforesaid lens system, a cemented lens pair type, with the refractive index of the positive lens thereof being less than that of the negative lens; and further, in order to balance the remaining over-corrected Petzval sum with other aberrations, the spherical aberration is of a type which is reverse to the normal corrected state, as seen in FIG. 2(a), so as to obtain well balanced condition of the aberrations.

In a sense the present invention contemplates the provision of a telephoto lens system comprising six lenses in which L is less than $0.85f$, the rear face of the fourth lens is convex, and satisfying the following conditions:

$$n_5 < n_6$$
$$F_{123} < f$$
$$F_{1234} < \frac{f}{1.9}$$
$$l_4 \geq 0.07f$$
$$|r_8| < 3f$$

wherein said lenses are identified consecutively as the first to the sixth lens, $f$ is the focal length of the lens system, $F_{1,2\ldots n}$ is the resultant focal length of the first through the $n$th lens, $n_n$ is the index of refraction of the corresponding subscript designated lens, $l_n$ is the distance between the rear face of the subscript designated lens and the front face of the next successive lens, $r_8$ is the radius of curvature of the rear face of the fourth lens, and L is the distance between the first lens front face and the focal plane of the lens system. The fifth and sixth lenses advantageously have cemented mating surfaces.

BRIEF DESCRIPTION OF THE FIGURES

FIGURE 1 is a longitudinal sectional view of an optical lens system embodying the present invention;

FIGURES 2a, 2b and 2c represent the aberration curves of the lens system with respect to an infinitely distant object in which (a) illustrates the spherical aberration by solid line and the sine condition by broken line, (b) illustrates distortion aberration and (c) illustrates astigmatism, meridional by broken line and sagittal by solid line; and FIGURES 3a, 3b and 3c show curves corresponding to those of FIGURE 2 but with respect to an object spaced $7f$ from the lens system.

DESCRIPTION OF THE PREFERRED EMBODIMENT

Referring now to the drawing and particularly FIGURE 1 thereof which illustrates a preferred embodiment of the present invention, the improved telephoto lens includes:

A positive first or front lens 1 of thickness $d_1$ and a front face of radius of curvature $r_1$ and a rear face of radius of curvature $r_2$;

A negative second lens 2 of thickness $d_2$ with a front face of radius of curvature $r_3$ and spaced from the rear face of the first lens 1 a distance $l_1$ and a rear face of radius of curvature $r_4$;

A positive third lens 3 of thickness $d_3$ with a front face of radius of curvature $r_5$ and spaced from the rear face of the second lens 2 a distance $l_2$ and a rear face of radius of curvature $r_6$;

A positive fourth lens 4 of thickness $d_4$ with a front face of radius of curvature $r_7$ and spaced from the rear face of the third lens 3 a distance $l_3$ and a convex rear face of radius of curvature $r_8$;

A fifth positive lens 5 of thickness $d_5$ with a front face of radius of curvature $r_9$ and spaced from the rear face of the fourth lens 4 a distance $l_4$ and a rear face of radius of curvature $r_{10}$; and A sixth negative lens 6 of thickness $d_6$ with a front face mating and cemented to the rear face of the fifth lens 5 and of the same radius of curvature $r_{10}$ and a rear face of radius of curvature $r_{11}$.

The lenses 1, 2, 3, 4, 5 and 6 are consecutively coaxially positioned and the lens thickness $d_n$ and the lens distances $l_n$ are measured along the central optical axis of the lens system. The indices of refraction of the lenses 1, 2 . . . 6 are $n_1, n_2 \ldots n_6$ respectively.

The telephoto lens system possesses the following dimensions and relationships and satisfy the following conditions:

The index of refraction of the fifth lens is less than that of the sixth lens, $$n_5 < n_6 \quad (1)$$

the resultant focal length of the lens 1, 2 and 3 is less than the focal length $f$ of the telephoto lens system, $$F_{123} < f \quad (2)$$

the resultant focal length of lenses 1, 2, 3 and 4 is less than the focal length of the telephoto system divided by 1.9, $$F_{1234} < f/1.9 \quad (3)$$

the distance between the confronting faces of the fourth and fifth lenses 4 and 5 is equal to or greater than $0.07f$, $$l_4 \geq 0.07f \quad (4)$$

the rear face of the fourth lens is convex, the corresponding eighth surface being concave forwardly or toward the object and its radius of curvature $r_8$ is less than $3f$, $$|r_8| < 3f \quad (5)$$

The condition (1) corrects the Petzval sum over-correction to a certain degree, the conditions (2), (3) and (4) serve to increase the telephoto ratio, and the condition (5) cooperates with the condition (2) or (3) to produce an undercorrected aberration of a higher order at the eighth surface.

In the example, the ninth order terms are very large so that the configuration of the spherical aberration curve is reverse to those commonly met as seen in (a) of the drawings, so that despite the included over-corrected Petzval sum there is established an excellent aberration balance.

One of the great advantages of the telphoto lens system according to the present invention is that with excellen compensation with respect to an infinitely distant object, aggravation of aberrations with respect to an object of small distance is of a very small degree, as shown in FIG. 3, such property not being found among conventional telephoto objectives.

The data of a specific example of the present lens system is as follows:

TABLE 1

[1:4.0 $f = 100$ mm.]

| | | $n_d$ | $\nu_d$ |
|---|---|---|---|
| $r_1 = 37.547$ | | | |
| | $d_1 = 3.5$ | 1.51633 | 64.1 |
| $r_2 = -400.409$ | | | |
| | $l_1 = 1.5$ | | |
| $r_3 = -78.028$ | | | |
| | $d_2 = 1.0$ | 1.76182 | 26.5 |
| $r_4 = 219.828$ | | | |
| | $l_2 = 1.5$ | | |
| $r_5 = 28.091$ | | | |
| | $d_3 = 3.2$ | 1.51276 | 59.76 |
| $r_6 = 174.583$ | | | |
| | $l_3 = 20.0$ | | |
| $r_7 = 203.294$ | | | |
| | $d_4 = 2.0$ | 1.53256 | 46.00 |
| $r_8 = -80.194$ | | | |
| | $l_4 = 10.5$ | | |
| $r_9 = -16.250$ | | | |
| | $d_5 = 1.2$ | 1.59270 | 35.8 |
| $r_{10} = -9.850$ | | | |
| | $d_6 = 0.8$ | 1.67000 | 57.3 |
| $r_{11} = -146.469$ | | | |

$L = 74.2$

In Table 1 $n_d$ designates the index of refraction of the corresponding lens, and $\nu_d$ the $\nu$ value thereof.

The Seidel coefficients of the specific example are as follows:

TABLE 2

| | Spherical Aberration | Sine Condition | Astigmatism | Petzval Sum | Distortion |
|---|---|---|---|---|---|
| 1 | 4.242 | 1.592 | 0.598 | 0.906 | 0.565 |
| 2 | 2.649 | −1.507 | 0.858 | 0.085 | −0.536 |
| 3 | −9.142 | 3.196 | −1.117 | −0.554 | 0.584 |
| 4 | 0.001 | 0.011 | 0.069 | −0.196 | −0.762 |
| 5 | 5.455 | 2.226 | 0.908 | 1.206 | 0.863 |
| 6 | 1.062 | −0.904 | 0.769 | −0.194 | −0.489 |
| 7 | −1.035 | 0.797 | −0.613 | 0.170 | 0.340 |
| 8 | 6.186 | −0.755 | 0.092 | 0.433 | −0.064 |
| 9 | −8.796 | −3.247 | −1.198 | −2.290 | −1.287 |
| 10 | −1.224 | −0.842 | −0.579 | −0.295 | −0.601 |
| 11 | 0.286 | −0.445 | 0.693 | 0.273 | −1.505 |
| SUM | −0.313 | 0.122 | 0.480 | −0.453 | −2.894 |

The higher order spherical aberration coefficients are as follows:

TABLE 3

| | 3rd Order | 5th Order | 7th Order | 9th Order |
|---|---|---|---|---|
| 1 | 2.1211447 | 8.7501959 | 42.147395 | 220.83777 |
| 2 | 1.3247504 | 11.651725 | 92.628595 | 710.39007 |
| 3 | −4.5711358 | 37.816643 | −305.34048 | −2449.1506 |
| 4 | 0.0009670357 | 0.02436736 | 0.41126752 | 4.4035697 |
| 5 | 2.7279331 | 33.06916 | 442.24276 | 5959.7678 |
| 6 | 0.5313714 | 7.8895699 | 111.89019 | 1733.4219 |
| 7 | −0.51777695 | −7.5435313 | −106.38079 | −1635.6796 |
| 8 | 3.0934067 | 47.818785 | 740.35895 | 11764.328 |
| 9 | −4.3981784 | −54.434616 | −658.86776 | −7309.1616 |
| 10 | −0.6124088 | −6.9864727 | −71.593818 | −401.75307 |
| 11 | 0.14316257 | 0.09424598 | 0.26052881 | 179.21543 |
| | −0.15676403 | 2.5167842 | 287.75681 | 8776.6194 |

While there has been described and illustrated a preferred embodiment of the present invention, it is apparent that numerous alterations, omissions and additions may be made without departing from the spirit thereof.

What is claimed is:

1. A telephoto lens system comprising six lenses consecutively designated as the first to the sixth lens, said fifth and sixth lenses having confronting mating cemented surfaces and said lens system possessing the following parameters:

| | | $n_d$ | $\nu_d$ |
|---|---|---|---|
| $r_1 = 37.547$ | | | |
| | $d_1 = 3.5$ | 1.51633 | 64.1 |
| $r_2 = -400.409$ | | | |
| | $l_1 = 1.5$ | | |
| $r_3 = -78.028$ | | | |
| | $d_2 = 1.0$ | 1.76182 | 26.5 |
| $r_4 = 219.828$ | | | |
| | $l_2 = 1.5$ | | |
| $r_5 = 28.091$ | | | |
| | $d_3 = 3.2$ | 1.51276 | 59.76 |
| $r_6 = 174.583$ | | | |
| | $l_3 = 20.0$ | | |
| $r_7 = 203.294$ | | | |
| | $d_4 = 2.0$ | 1.53256 | 46.00 |
| $r_8 = -80.194$ | | | |
| | $l_4 = 10.5$ | | |
| $r_9 = -16.250$ | | | |
| | $d_5 = 1.2$ | 1.59270 | 35.8 |
| $r_{10} = -9.850$ | | | |
| | $d_6 = 0.8$ | 1.67000 | 57.3 |
| $r_{11} = -146.469$ | | | | wherein the successive faces of the first to the fifth lenses are consecutively designated as the first to the tenth face and the rear face of the sixth lens is designated as the eleventh face; $r_n$ is the radius of curvature of the $n$th lens face, $d_j$ is the thickness of the $j$th lens; $l_k$ is the spacing between the $k$th lens and the next successive lens; $n_d$ is the index of refraction of the $d$th lens and $\nu_d$ is the Abbe value of the $d$th lens.

References Cited

UNITED STATES PATENTS 2,685,230  8/1954  Baker _____ 350—214 X
3,255,664  6/1966  Smith _____ 350—215
3,320,016  5/1967  Van Graafeiland _____ 350—215

JOHN K. CORBIN, Primary Examiner